US007649828B2

(12) United States Patent
Shah et al.

(10) Patent No.: US 7,649,828 B2
(45) Date of Patent: Jan. 19, 2010

(54) METHOD AND SYSTEM FOR SPLIT-PAIR RECEPTION IN TWISTED-PAIR COMMUNICATION SYSTEMS

(75) Inventors: Sunil C. Shah, Los Altos, CA (US); Ioannis Kanellakopoulos, Cupertino, CA (US); Mark A. Erickson, Sacramento, CA (US)

(73) Assignee: Tokyo Electron Limited, Tokyo (JP)

( * ) Notice: Subject to any disclaimer, the term of this patent is extended or adjusted under 35 U.S.C. 154(b) by 621 days.

(21) Appl. No.: 10/526,145

(22) PCT Filed: Sep. 19, 2003

(86) PCT No.: PCT/US03/29937

§ 371 (c)(1),
(2), (4) Date: Oct. 14, 2005

(87) PCT Pub. No.: WO2004/027579

PCT Pub. Date: Apr. 1, 2004

(65) Prior Publication Data
US 2006/0109779 A1    May 25, 2006

Related U.S. Application Data

(60) Provisional application No. 60/412,160, filed on Sep. 19, 2002.

(51) Int. Cl.
*H04J 1/12* (2006.01)
(52) U.S. Cl. .................... 370/201; 370/289; 370/350
(58) Field of Classification Search ............ 370/201, 370/289; 375/224, 225, 257, 285, 346, 350, 375/229; 455/295, 296, 500
See application file for complete search history.

(56) References Cited

U.S. PATENT DOCUMENTS

| 5,887,032 | A | * | 3/1999 | Cioffi | ............... 375/257 |
| 5,991,311 | A | | 11/1999 | Long et al. | |
| 6,885,746 | B2 | | 4/2005 | Hausman et al. | |
| 7,158,563 | B2 | * | 1/2007 | Ginis et al. | ............... 375/224 |

FOREIGN PATENT DOCUMENTS

EP    1 164 758 A2    12/2002

OTHER PUBLICATIONS

Saleheen, U.S. Appl. No. US 2002/0186428 A1, Pub. Date Dec. 12, 2002.
Michael L. Honig, Pedro Crespo, & Kenneth Steiglitz, Suppression of Near- and Far-End Crosstalk by Linear Pre- and Post-Filtering, IEEE Journal on Selected Areas in Communications, vol. 10, No. 3, (16 Pages), Apr. 1992.
European Patent Office, Supplementary European Search Report, Application No. 00993153.6, dated May 2, 2007 (3 pages).

* cited by examiner

*Primary Examiner*—Kevin C Harper
*Assistant Examiner*—Henry Baron
(74) *Attorney, Agent, or Firm*—Wood, Herron & Evans LLP (57) ABSTRACT

A method and system are disclosed for improving the performance of a multiline transmission system by using one or more split-pair receivers in a multiline communications system to identify crosstalk on a pair of transceivers coupled to the split pair receivers, wherein each split pair receiver receives a signal including the crosstalk from each transceiver and provides a corresponding signal vector to a post processing unit, and performing MIMO post-processing on signal vectors received at a receiver from each transceiver and each split-pair receiver while minimizing crosstalk on pairs of lines in the multiline communications system with a frequency equalizer.

9 Claims, 8 Drawing Sheets

FIG. 7

METHOD AND SYSTEM FOR SPLIT-PAIR RECEPTION IN TWISTED-PAIR COMMUNICATION SYSTEMS This application claims the benefit of the filing date of the following Provisional U.S. Patent Application:

Split-Pair Signals in Communications Systems, U.S. Provisional Application Ser. No. 60/412,160, filed on Sep. 19, 2002.

FIELD OF THE INVENTION

The present invention relates generally to copper-based communication systems and, in particular to, multiple line transmission in copper-based communication systems.

BACKGROUND OF THE INVENTION

The explosive popularity of the Internet has ushered in a new era for telecommunications. The expanding use of applications such as e-mail, online services, secure electronic transactions, media file sharing, video conferencing, remote collaboration, and telecommuting, to name but a few, is causing a significant increase in the bandwidth needs and demands of telecommunications users.

As a result, service providers around the world are continuously searching for economically attractive ways of deploying new high-bandwidth, high-revenue services. Over the last few years, telephone, cable, and wireless operators have been upgrading their equipment in order to utilize their existing infrastructures for higher-bitrate services. The result has been the widespread availability of high-speed data connectivity through Digital Subscriber Line (DSL) service, high-speed digital cable, and, more recently, Third Generation (3G) wireless networks.

Copper telephone lines are generally viewed as the most widely available access medium that is suitable for high-speed data connectivity. In an impressive display of technological progress, the lines that until a few years ago carried only low-speed voice services, are now used to deliver services running at speeds up to several Mbps (Mega-bits per second). This progress has caused the existing copper infrastructure to be viewed as a significant capital asset that telephone carriers can utilize to meet the increasing bandwidth demands of their customers.

Over the last two decades, several technologies for data transmission over copper lines have been developed, including, but not limited to these technologies: T1/E1, ISDN (integrated services digital network), HDSL (High Speed DSL), SDSL (Symmetric DSL), ADSL (Asymmetric DSL), VDSL (Very High Speed DSL) and ADSL2. These technologies have continued to increase the data throughput that can be delivered over copper, but that progress is now being slowed by the shortcomings of the existing copper infrastructure.

Typically, a copper line consists of two copper wires that are twisted together to produce a "twisted copper pair." Multiple twisted pairs are then twisted together into bundles called "binders." Twisting of pairs was not used in the early days of voice telephony. It was introduced later in an effort to reduce the effect of interference noise on the received signal. The logic behind this noise reduction is as follows: Interference noise on each copper pair is caused by sources outside the copper pair, such as services operating on other copper pairs in the same binder or in adjacent binders, radio towers, power wires, electrical appliances at the customer's premises, etc. Those sources transmit signals whose electromagnetic fields generate noise voltage signals on each copper wire. If the two wires were not twisted together, the electromagnetic fields from the noise sources could potentially have very different values on each of the two wires, and thus they could generate very different noise voltage signals on each of the two wires. By twisting the two wires together in a copper pair, the electromagnetic fields from the noise sources have roughly the same value on both wires, and therefore they generate noise voltage signals that are approximately equal on both wires. Therefore, when these approximately equal noise signals are subtracted at the differential receiver of the copper pair, the resulting differential noise voltage signal is much smaller than it would have been had the two wires not been twisted. On the other hand, the main communications signal, which is transmitted as the voltage difference between the two wires of the copper pair, is not affected by the twisting of the wires and is received by the differential receiver in full strength. Therefore, the use of twisted copper pairs and differential receivers reduces the effect of the noise only, and does not have a similar reduction effect on the main signal. As a result, the SNR (Signal-to-Noise Ratio), and thus also the communications capacity, that can be achieved on a twisted copper pair with a differential transmitter and receiver is substantially higher than the SNR of an untwisted copper pair of the same gauge and length with a common-mode (i.e., non-differential) transmitter and receiver.

When telephone carriers began setting the specifications for the copper pairs used in their cables, including the gauge and twisting of the wires, they considered only POTS (Plain-Old Telephone Service) voice services, which typically occupy only a small frequency band at the low end of the spectrum, approximately from 0 to 4 kHz. As a result, they decided to use relatively thin wires, mostly 26AWG and 24AWG, and to twist them once every few feet or so. At the time, these choices of gauge and twist length represented an excellent tradeoff between performance and cost. Wires of larger gauges that are twisted more tightly cost more to produce and are heavier, larger, and less flexible; therefore, they also cost more to transport and to install. Moreover, having enough copper pairs to serve all the current and future customers in a given area means that, as the wires become larger and heavier, the underground conduits that carry them have to be larger, and the poles that support them have to be sturdier. Since POTS service utilizes frequencies below 4 kHz, these choices of gauge and twist length were perfectly adequate for ensuring high-quality POTS service with very low crosstalk noise. Crosstalk originally denoted the noise that was generated when the voice of one telephone subscriber talking on his line "crossed" into another subscriber's line and could be heard as low-volume background speech.

Unfortunately, these choices do not guarantee the same performance when the copper pairs are used to deliver high-speed data services, which typically operate at frequencies that are more than 100 times higher than POTS frequencies. The small gauge of the wires results in high attenuation of high-frequency signals; as a result, the data capacity of a copper pair decreases rapidly as the length of the pair increases. Even worse, the long twisting of existing copper pairs is much less effective at reducing crosstalk noise at higher frequencies. As the frequencies used for transmission and reception of signals rise, the wavelengths of those signals are reduced. Therefore, pairs with long twisting appear more and more as untwisted pairs to the corresponding short-wavelength electromagnetic fields. Since the cost of replacing existing copper pairs with new ones that have much shorter twisting would be prohibitively high, the only economically viable option is to use existing pairs for the transmission of high-speed data services. As a result, high-speed data services are much more sensitive to crosstalk noise from outside sources. This is especially detrimental on longer lines, since the main signal on those lines is already significantly attenuated; as a result, the increased crosstalk noise often reduces the SNR to levels that are not suitable for high-speed data transmission.

The realization that crosstalk is one of the primary causes of performance degradation in high-speed data transmission over copper pairs has resulted in substantial attention to the problem of mitigating crosstalk. Transmission technologies designed for operation over a single copper pair attempt to mitigate crosstalk through the use advanced coding schemes and adaptive filters that aim to maximize SNR in a given crosstalk environment. Such mitigation techniques have evolved steadily over the last decade, and have reached a level of maturity where small additional SNR gains come at the cost of significant increases in complexity.

The most recent advance in the effort to mitigate crosstalk on copper pairs is the use of "vectoring" in multiline transmission schemes. In such schemes, multiple copper pairs are used to deliver high-speed services; but instead of simply using each copper pair as a separate communications channel and "bonding" the corresponding data streams at the digital layer, vectoring techniques coordinate the transmission and/or reception of signals at the physical layer, in order to increase the overall capacity of the multiline communications channel. One such vectoring scheme, disclosed in a recent application PCT/US 03/18004, which is incorporated herein by reference, exploits the correlation of crosstalk noise across its associated multiple copper pairs. In particular, that scheme treats the transmitters and receivers on multiple copper pairs as inputs and outputs of a MIMO (Multiple Input Multiple Output) communications channel. Operating in the signal space defined by these multiple inputs and outputs, the scheme identifies the subspace that contains the crosstalk noise, and then uses MIMO pre-processing at the transmitter and MIMO post-processing at the receiver to transmit most of its main signal in the subspace that is orthogonal to the crosstalk noise. For DMT (Discrete-Multi-Tone) systems, these operations are simply matrix multiplications in the frequency domain. The MIMO post-processing at the receiver consists of multiplying the received symbol vector in each bin by a matrix that combines the operations of noise pre-whitening and frequency equalization. The MIMO pre-processing at the transmitter consists of multiplying the transmitted symbol vector in each bin with a matrix that compensates for the distortion caused by the noise pre-whitening matrix at the receiver. As a result, the main signal is received without distortion, while the crosstalk noise, which is not multiplied by the MIMO pre-processing matrix, is restricted to a small subspace of the received signal space.

Another way of interpreting the vectoring effect of that MIMO scheme is that it identifies the crosstalk noise on some of its receivers and then removes it from the remaining receivers, thereby significantly reducing its overall effect. As a rule of thumb, the effectiveness of this type of crosstalk mitigation is reduced as the number of strong independent crosstalk sources increases beyond the number of receivers available in the multiline system. This is due to the fact that each independent crosstalk source increases the dimension of the crosstalk subspace by one. As the number of such crosstalk sources increases beyond the number of receivers available, the dimension of the crosstalk subspace becomes equal to the dimension of the signal space of the multiline system, thereby eliminating the orthogonal subspace where the main signal can be received free of crosstalk noise.

Therefore, it would be desirable to find a way to increase the dimension of the signal space in a multiline system for a given number of copper pairs used.

SUMMARY OF THE INVENTION

A method and system are disclosed for improving the performance of a multiline transmission system by adding "split-pair" receivers to measure and process additional signals across copper pairs. These additional "split-pair" receivers increase the dimension of the signal space and therefore enhance the crosstalk mitigation abilities of the multiline system.

BRIEF DESCRIPTION OF THE DRAWINGS

Features and advantages of the present invention will be apparent to one skilled in the art in light of the following detailed description in which.

DETAILED DESCRIPTION

A method and system are described for improving the performance of a multiline transmission system by receiving additional signals across copper pairs. For purposes of discussing and illustrating the invention, an example of a multiline system using two copper pairs will be described. However, one skilled in the art will recognize and appreciate that the same methodology can be applied to multiline systems with more than two copper pairs.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In varying embodiments, the present invention can be implemented by an apparatus for performing the disclosed method. The apparatus may be specially constructed or may comprise a general-purpose computer such that when configured by a computer program executes the disclosed method. Such a computer program may be stored in a computer readable storage medium, such as, but not limited to, floppy disks, optical disks, CD-ROMs, and magnetic-optical disks, read-only memories (ROMs), random access memories (RAMs), magnetic or optical cards, or any type of media suitable for storing electronic instructions.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

The algorithms and displays presented herein are not inherently related to any particular computer or other apparatus. Various general-purpose systems may be used with programs in accordance with the teachings herein, or it may prove convenient to construct a more specialized apparatus to perform the required method. For example, any of the methods according to the present invention can be implemented in hard-wired circuitry, by programming a general-purpose processor or by any combination of hardware and software. One of skill in the art will appreciate that the invention can be practiced with computer system configurations other than those described below, including hand-held devices, multi-processor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Overview of a General Communication Network

Figure 1:
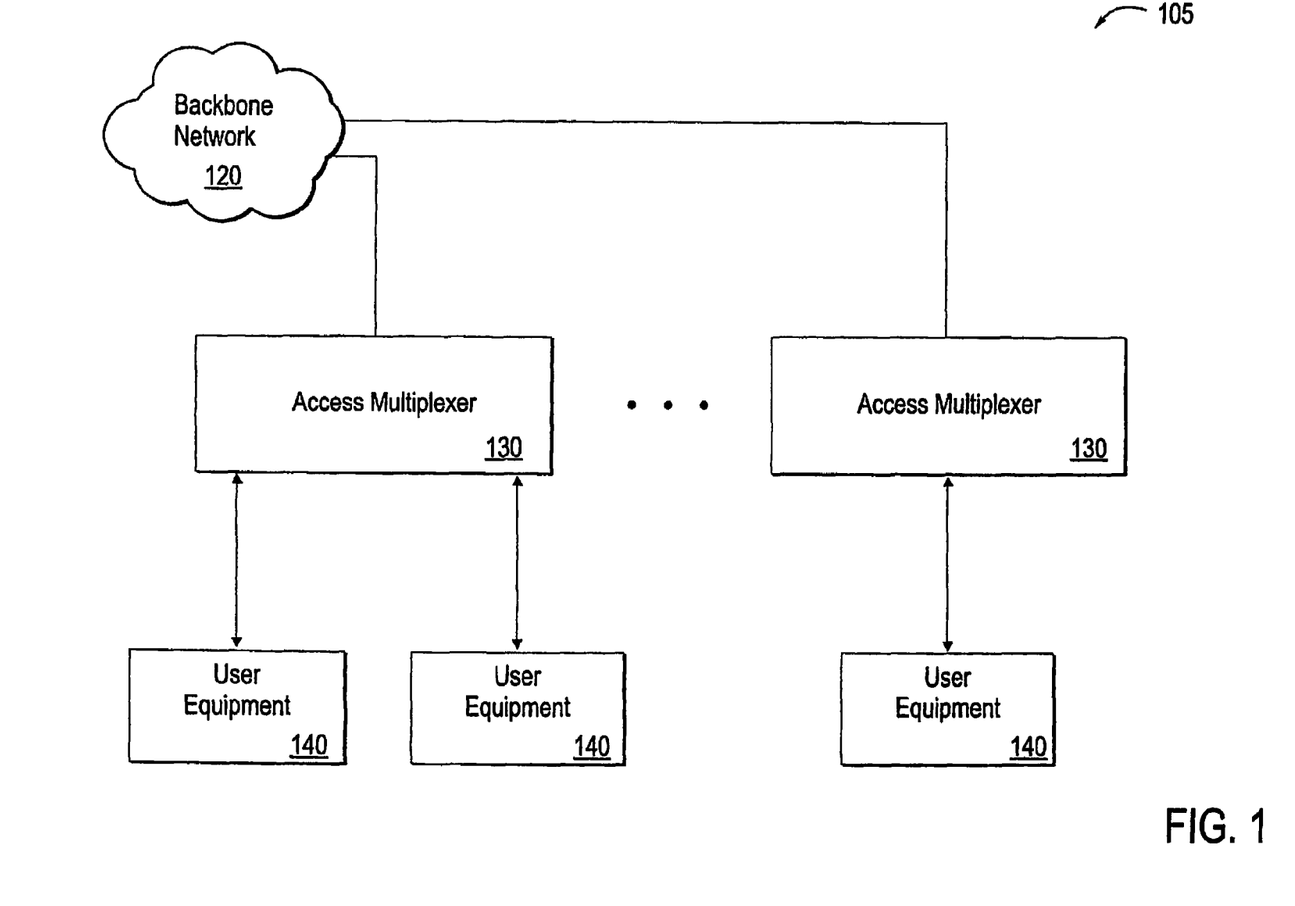
FIG. 1 illustrates an exemplary communication system that may benefit from the present method and system.

FIG. 1 illustrates an exemplary communication system 105 that may benefit from the present method and system. The backbone network 120 is generally accessed by a user through a multitude of access multiplexers 130 such as: base stations, DSLAMs (DSL Access Mulitplexers), or switchboards. The access multiplexers 130 communicate with the network users. The user equipment 140 exchanges user information, such as user data and management data, with the access multiplexer 130 in a downstream and upstream fashion. The upstream data transmission is initiated at the user equipment 140 such that the user data is transmitted from the user equipment 140 to the access multiplexer 130. Conversely, the downstream data is transmitted from the access multiplexer 130 to the user equipment 140. User equipment 140 may consist of various types of receivers that contain modems such as: cable modems, DSL modems, and wireless modems. In this network access system the current method and system may be practiced to identify sources of interference in the access channels.

Overview of Exemplary DSL System

"DSL" is to be understood to refer to a variety of Digital Subscriber Line (DSL) standards that, even now, are evolving. Each DSL standard will be referred to as a DSL service type. At the present time, DSL service types include, but are not limited to, ADSL, SDSL, HDSL, and VDSL (Asymmetrical, Symmetrical, High speed, and Very high speed DSL, respectively).

Figure 2:
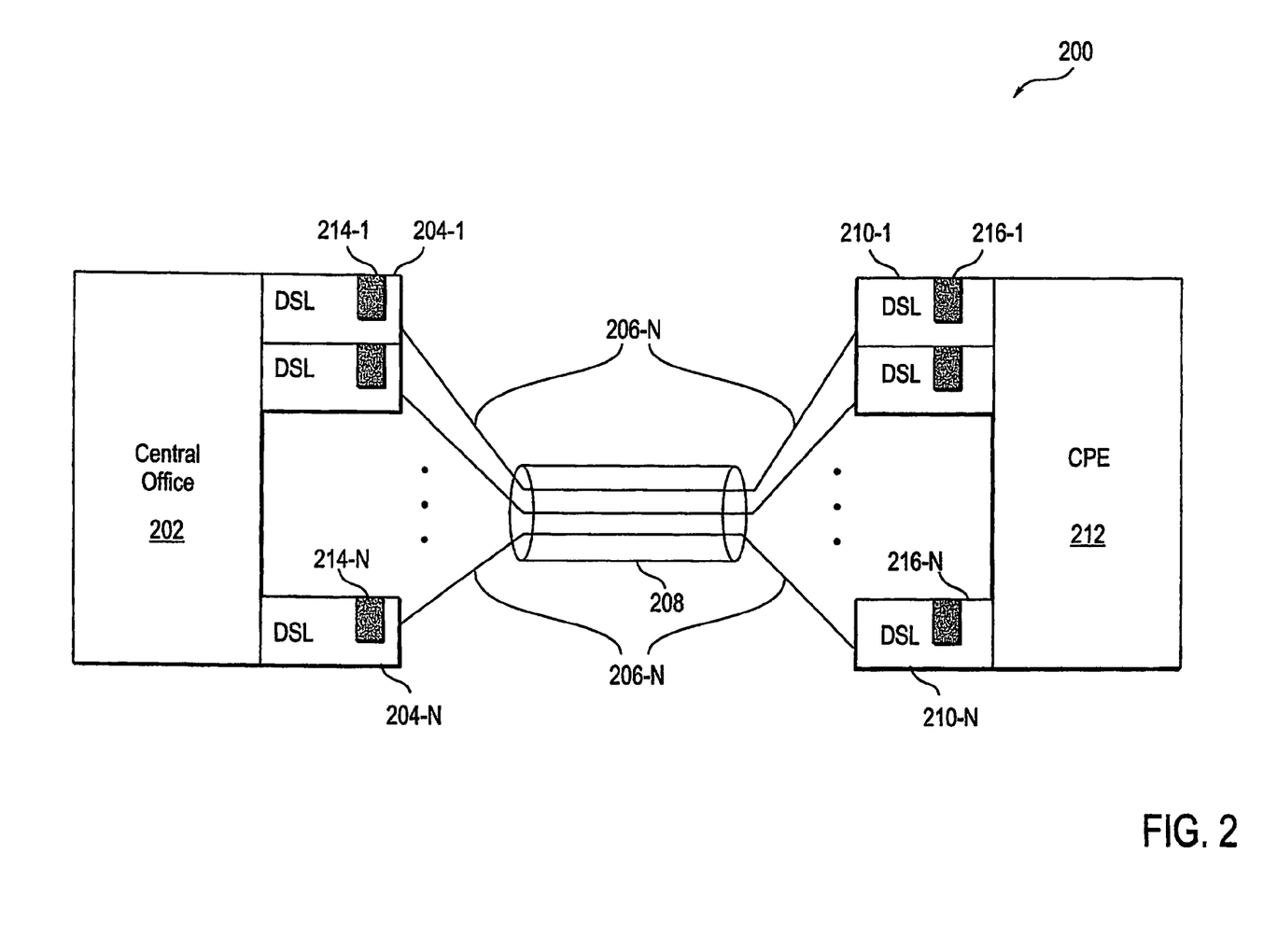
FIG. 2 illustrates an exemplary embodiment of a communication system, wherein the present method and system may be implemented.

FIG. 2 illustrates an exemplary embodiment of a communication system wherein the present invention may be implemented. A central office 202 has a series of DSL modems 204-1 through 204-N, including transceivers 214-1 through 214-N, connected via twisted pairs 206-1 through 206-N as a bundle 208 connected to customers DSL 210-1 through 210-N, including transceivers 216-1 through 216-N, which is connected respectively to customers premise equipment (CPE) 212, such as a local area network or computer. One skilled in the art recognizes that twisted pair bundle 208 may experience crosstalk between the twisted pairs 206-1 through 206-N and depending upon the services carried by the pairs, data rates, and other factors, such as proximity of the pairs to each other, etc., there may be varying types of crosstalk on each pair, such as alien or out of domain crosstalk.

Split-Pair Receiver AFE

The present invention discloses a method for improving the crosstalk mitigation capabilities of a multiline system by increasing the dimension of the signal space without increasing the number of copper pairs. By inserting additional receiver circuitry between the wires of adjacent copper pairs and modifying the multiline transmission scheme to incorporate the additional receiver measurements, it is possible to increase the dimension of signal space within the multiline system while maintaining the existing quantity of copper pairs. This effectively "splits" the copper pairs of the multiline system, and is therefore called a "split-pair" receiver.

Figure 3:
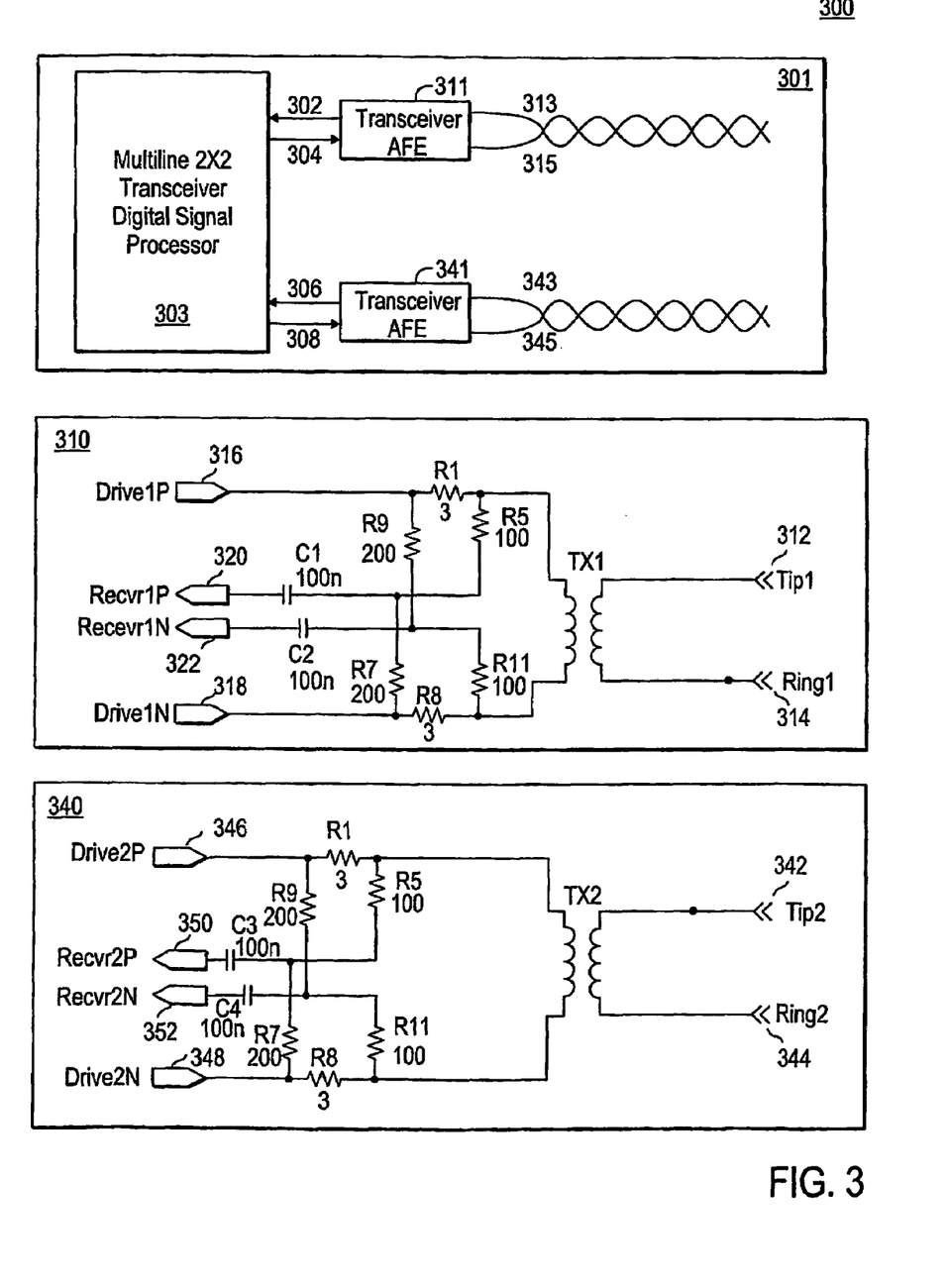
FIG. 3 illustrates an exemplary two-pair multiline transmission system for reducing crosstalk noise utilizing one AFE (Analog Front End) circuit for each copper pair, for a total of two AFE circuits.

FIG. 3 illustrates an exemplary two-pair multiline transmission system for reducing crosstalk noise utilizing one AFE (Analog Front End) circuit for each copper pair, for a total of two AFE circuits. The multiline system 301 includes two separate but essentially identical AFE circuits 311 and 341, each devoted to one of the two copper pairs connected to the multiline system 301 at Tip1 313, Ring1 315, Tip2 343, and Ring2 345, respectively. Differential receiver lines 302 and 306 are connected to the multiline 2×2 transceiver 303 for receiving signals from their associated twisted copper pairs 313, 315, and 343, 345, respectively. Differential transmission lines 304 and 308 are connected to the multiline 2×2 transceiver 303 for transmitting signals through to their associated twisted copper pairs 313, 315, and 343, 345, respectively.

The multiline 2×2 transceiver 303 includes a digital signal processor wherein MIMO processing can be performed in either the time domain or the frequency domain as further discussed below in reference to FIGS. 5, 6, and 7. The 2×2 designation refers to the number of differential transmitter lines, in this case two, 304 and 308, and the number of differential receiver lines, again two, 302 and 306. Further, 2×2 defines the size of the matrix associated with the MIMO processing scheme.

Transceiver AFEs 310 and 340 illustrate in more detail the transceivers 311 and 341 of multiline transmission system 301. Drive1P 316, Drive1N 318, Drive2P 346 and Drive2N 348 further illustrate differential transmission lines 304 and 308. Recvr1P 320, Recvr1N 322, Recvr2P 350 and Recvr2N 352 further illustrate differential receiver lines 302 and 306. Tip1 312 and Ring1 314 illustrate twisted pair 313 and 315, respectively, of multiline transmission system 301 in AFE 310. Tip2 342, and Ring2 344 illustrate twisted pair 343 and 345, respectively, of multiline transmission system 301 in AFE 340.

The addition of split-pair receivers enhances the crosstalk mitigation capability of the multiline system over the two-pair multiline transmission system. The addition of split-pair circuitry increases the number of receivers that can be used to identify independent sources of crosstalk noise, and therefore increase the number of receivers from which the crosstalk noise can be effectively removed. This increases the dimension of the crosstalk-free subspace of the multiline system, and therefore increases the total bitrate that can be supported by the multiline system in a given crosstalk noise environment.

Figure 4A:
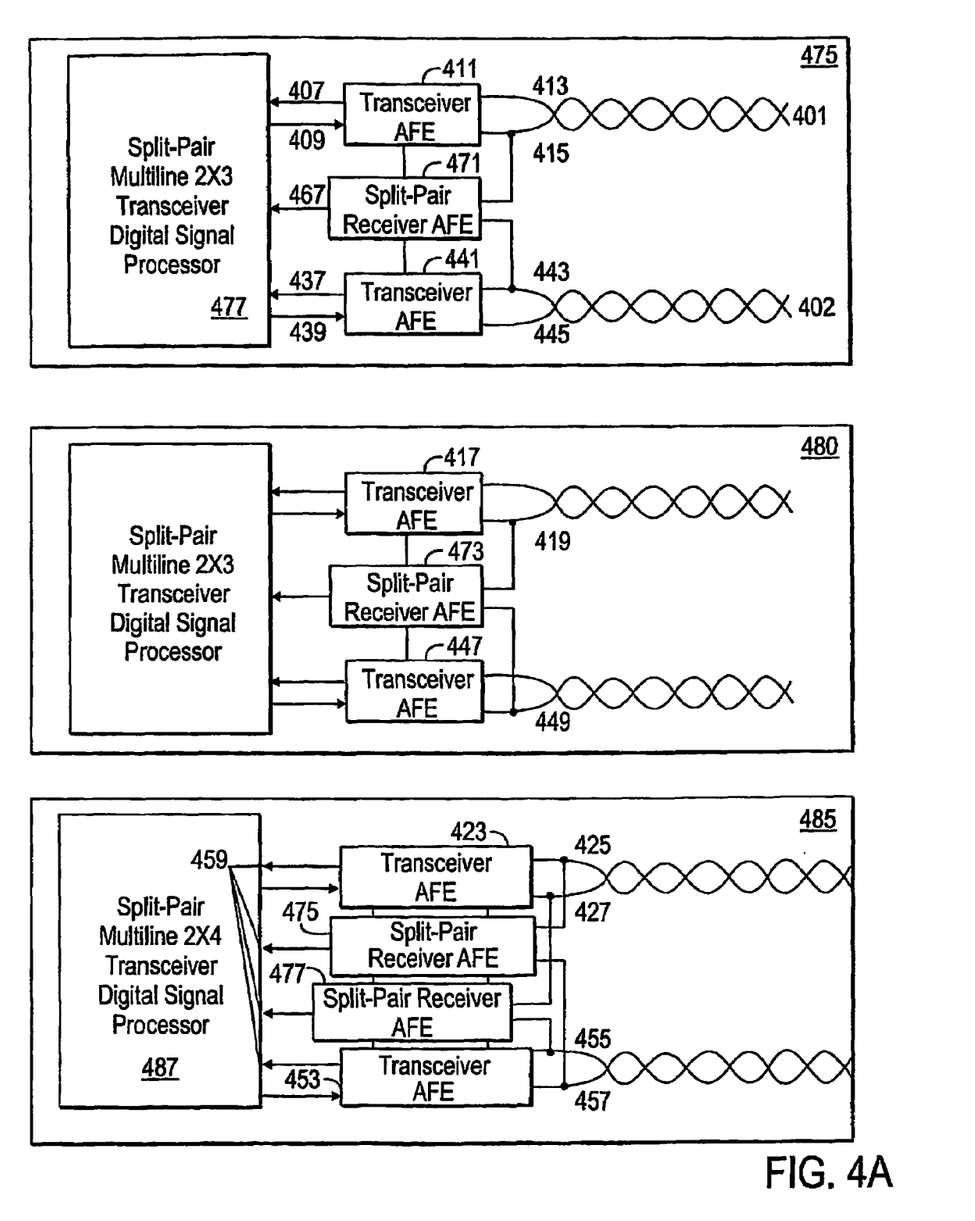
FIG. 4A illustrates various two-pair multiline transmission systems corresponding to several exemplary embodiments of the present invention as applied to two-pair multiline transmission systems.

FIG. 4A illustrates various two-pair multiline transmission systems corresponding to several exemplary embodiments of the present invention as applied to two-pair multiline transmission systems. Multiline transmission system 475 has transceiver AFEs 411 and 441 as similarly described in reference to FIG. 3 but with an additional split pair receiver 471. AFE 411 connects to twisted pair 401 through inputs Tip1 413 and Ring1 415. AFE 441 connects to twisted pair 402 through inputs Tip2 443 and Ring2 445. The split pair receiver 471 has two inputs that connect to Ring1 415 and Tip2 443. Additionally, multiline 2×3 transceiver 477 transmits signals to AFE 411 and 441 through differential lines 409 and 439, respectively. Multiline 2×3 transceiver 477 also receives signals from AFE 411, 441, and split pair receiver 471 through differential lines 407, 437, and 467, respectively. In this case, the 2×3 refers to the two differential transmitter lines, 409 and 439, and the three differential receiver lines, 407, 437, and 467. Further, 2×3 defines the size of the matrix associated with the MIMO processing discussed below with reference to FIGS. 5 through 7.

In another embodiment of the present invention, multiline transmission system 481 has transceiver AFEs 417 and 447, and split pair receiver 473, similarly described above with reference to the multiline transmission system 475. In this embodiment, however, the two inputs of split pair receiver 471 are connected to Ring1 419 and Ring2 449.

In yet another embodiment of the present invention, multiline transmission system 485 has transceiver AFEs 423 and 453, and split pair receivers 475 and 477. The two inputs of split pair receiver 475 are connected to Tip1 425 and Ring2 457 and the two inputs of split pair receiver 477 are connected to Ring1 427 and Tip2 455. The multiline 2×4 transceiver 487 receives differential input 459 from transceiver AFEs 423 and 453, and split pair receivers 475 and 477. The additional split pair receiver 477 adds an additional dimension (a fourth receiver input) to the matrix associated with the MIMO processing discussed below with reference to FIGS. 5 through 7.

Figure 4B:
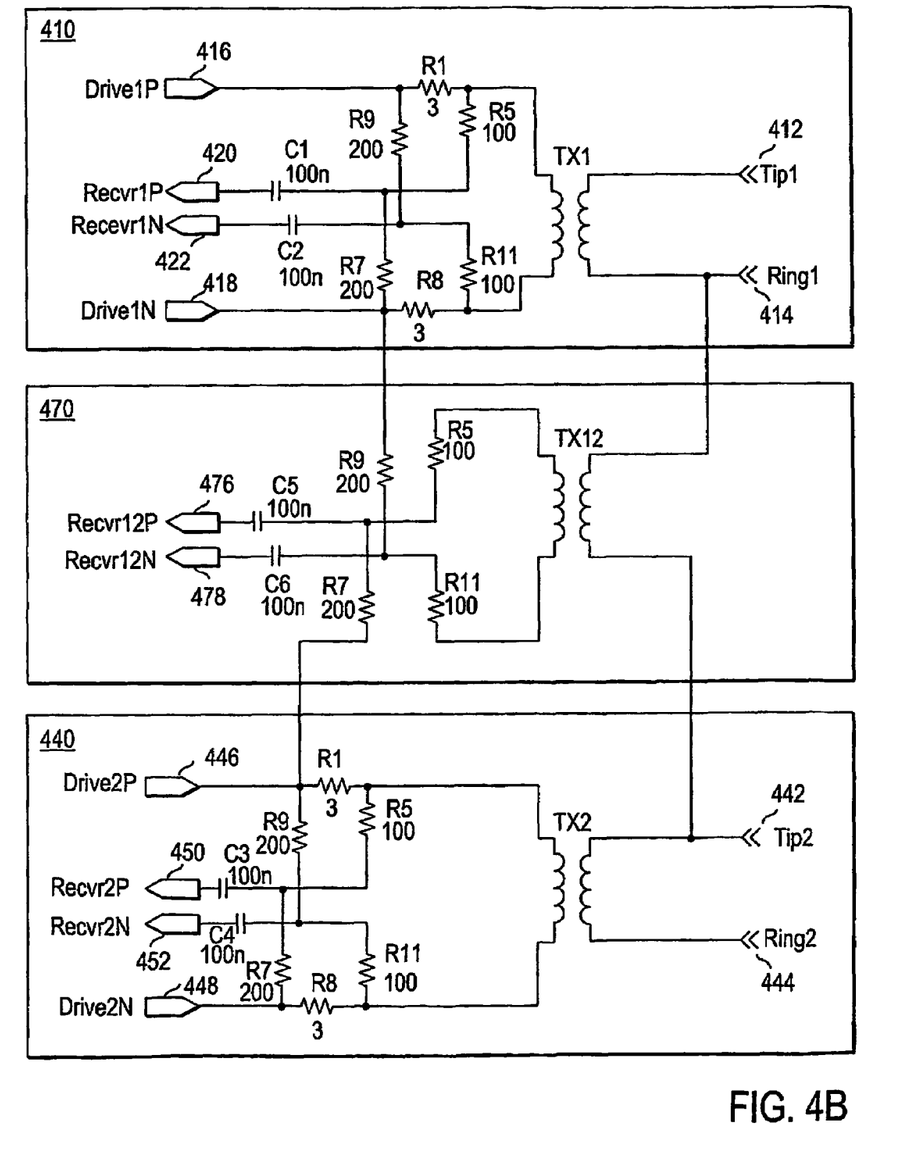
FIG. 4B illustrates a split-pair receiver circuit according to one embodiment of the present invention.

FIG. 4B illustrates a split-pair receiver circuit 400, according to one embodiment of the present invention. There are two separate but essentially identical AFE circuits 410 and 440, each devoted to one of the two copper pairs connected to the multiline system at Tip1 412, Ring1 414, Tip2 442, and Ring2 444, respectively. The differential lines Drive1P 416, Drive1N 418, Drive2P 446 and Drive2N 448 are connected to multiline transceiver circuitry (not shown) for transmitting signals through to their associated twisted copper pairs. The differential lines Recvr1P 420, Recvr1N 422, Recvr2P 450, Recvr2N 452 are connected to multiline transceiver circuitry for receiving signals through their associated twisted copper pairs. Additionally, a split pair receiver 470 is connected between AFEs 410 and 440. The split pair receiver 470 is a passive circuit coupled to AFE 410 by a connection at Ring1 414 and another connection at Tip2 442. Differential lines, Recvr12P 476 and Recvr12N 478, are also connected to the multiline transceiver circuitry.

One of ordinary skill in the art will recognize the additional circuit 470 as a passive receiver-only circuit. There is no driver for the split-pair receiver circuit 470 because it does not transmit any signals. The standard transceivers of AFEs 410 and 440 continue to transmit and receive signals in accordance with standard operations. The circuit 470 is balanced with respect to circuits 410 and 440, so that it neither affects nor is affected by their transmitted signals.

Further, it should be recognized by one of ordinary skill in the art, that the same concept is applicable to multiline systems that use more than two copper pairs. In particular, in a multiline system that uses N copper pairs, one can add up to N-1 split-pair receivers and process a total of 2N-1 received signals. These split-pair receivers can be added in many different configurations; for example, in a multiline system that uses three copper pairs, up to two split-pair receivers can be added between Ring1-Tip2 and Ring2-Tip3, or Tip1-Ring2 and Tip2-Ring3, or Ring1-Tip3 and Ring3-Tip2, or Tip1-Ring3 and Tip3-Ring2, or Ring1-Ring2 and Tip2-Tip3, and so on.

The reasoning behind limiting to N-1 the number of split-pair receivers in a multiline system that uses N copper pairs is that the total number of wires is 2N, and one of the wires is considered a reference ground for the differential receiver scheme, so that the total number of independent measurements that can be made on 2N wires is 2N-1. Since there are already N standard-pair receivers in the multiline system, adding more than N-1 split-pair receivers would produce measurements that are not independent. Nevertheless, one can use more than N-1 split-pair receivers to obtain repeated measurements of the main signal and the crosstalk noise. For example, the embodiment 485 illustrated in FIG. 4A shows a two-pair multiline system with two split-pair receivers 475 connected to Tip1 425 and Ring2 457, and 477 connected to Ring1 427 and Tip2 455. In general, in a multiline system that uses two copper pairs, one could add up to four split-pair receivers: Ring1-Tip2, Ring2-Tip1, Ring1-Ring2, and Tip1-Tip2. This addition would reduce the effect of the thermal background noise, which is independent on each receiver, and would therefore result in improved measurements of the main signal and the crosstalk noise. However, since additional receivers come at an additional component cost, it would be up to the system designer to decide whether the small increases in performance that can be obtained by adding more than N-1 split-pair receivers are enough to justify the extra cost.

The next step in the effort to enhance the performance of multiline systems would be to consider each wire in a copper pair as independent, and use it to transmit a separate signal. This scheme would result in the transmission of up to 2N-1 independent main signals over a multiline system that uses N copper pairs, and would further increase the data capacity of such a multiline system. However, the implementation of such a split-pair transmission scheme is not practical in the public telephone network, since there are strict regulations that severely limit the transmission of common-mode signals over copper pairs, in order to prevent excessive interference to the installed base of services using differential receivers. On the other hand, the addition of split-pair receivers, as disclosed in the present invention, is a passive receiver-only enhancement, and as such it is not limited by public telephone network regulations.

Split-Pair MIMO Processing

As is the case with MIMO processing schemes that use only standard receivers across copper pairs, the claimed method and system for split-pair receivers in the present invention is applicable to both frequency-domain transmission schemes, such as the Discrete Multi-Tone (DMT) scheme defined in the G.dmt and G.lite standards of the International Telecommunications Union (ITU), and time-domain transmission schemes, such as the 2B1Q scheme defined in the HDSL standard of the American National Standards Institute (ANSI). The preferred embodiment is with frequency-domain schemes, because the split-pair MIMO processing can be performed much more efficiently in the frequency domain, where it reduces to a simple matrix multiplication in each of the independent frequency bins. Frequency bins are the small frequency bands surrounding each individual "tone" or frequency carrier in a DMT system.

Figure 5:
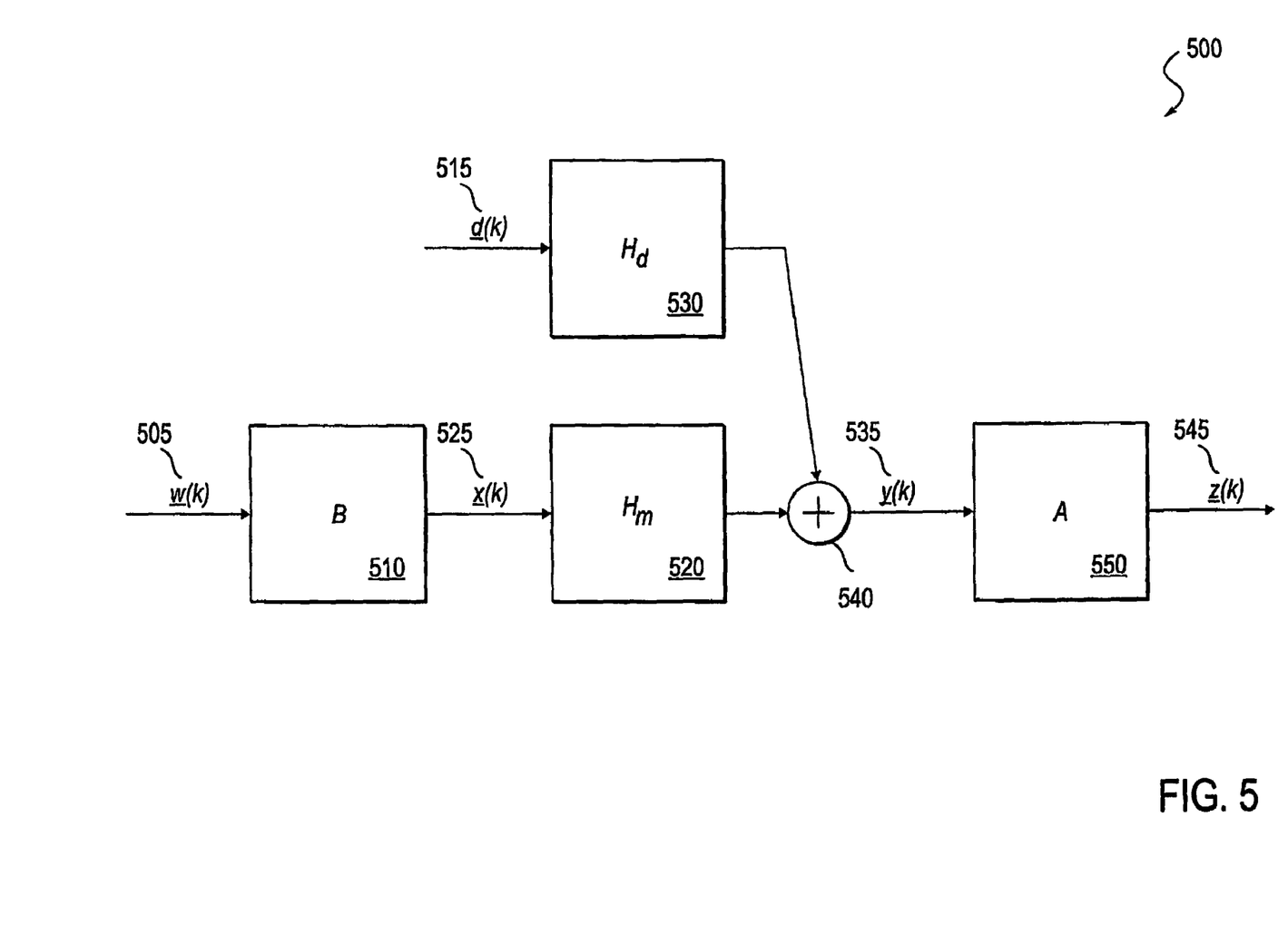
FIG. 5 illustrates an exemplary functional block diagram of split-pair MIMO processing according to one embodiment of the present invention.

FIG. 5 illustrates an exemplary functional block diagram 500 of split-pair MIMO (Multiple Input Multiple Output) processing according to one embodiment of the present invention. Referring to the block diagram of FIG. 5, we use the following notations:

k denotes the kth DMT symbol;

$n_s$ denotes the number of elements in the transmitted signal vector, which is equal to the number of transmitters used in the multiline system;

$n_r$ denotes the number of elements in the received signal vector, which is equal to the total number of receivers used in the multiline system, including standard receivers and split-pair receivers;

$n_d$ denotes the number of independent crosstalk noise sources that affect the multiline system;

w(k) 505 is a vector of symbols for a single frequency bin, which has $n_s$ elements;

x(k) 525 is a vector of signals to be transmitted in a single frequency bin after MIMO transmitter pre-processing, which has $n_s$ elements;

y(k) 535 is a vector of received signals in a single frequency bin before MIMO receiver post-processing, which has $n_r$ elements;

z(k) 545 is a vector of symbols to be decoded in a single frequency bin after MIMO receiver post-processing, which has $n_s$ elements;

d(k) 515 is the vector of interference signals, which has $n_d$ elements;

$H_m$ 520 is the main channel matrix for a single frequency bin, which is of dimension $n_r \times n_s$;

$H_d$ 530 is the interference matrix for a single frequency bin, which is of dimension $n_r \times n_d$;

B 510 is the transmitter MIMO pre-processing matrix for a single frequency bin, which is of dimension $n_s \times n_s$; and A 550 is the receiver MIMO post-processing matrix for a single frequency bin, which is of dimension $n_s \times n_r$.

The present invention assumes that the prefix is long enough and the time equalizer (TEQ) is designed well enough that there is no Inter-Block Interference (IBI), that $H_m$ is a full-rank matrix (this is always true if the multiline system uses exactly one transmitter per copper pair and at least one receiver per copper pair), and that the elements of d(k) 515 are random variables with $E[d(i)d^H(j)]=R_d$ for i=j and 0 otherwise, implying that the interference noise is uncorrelated between different symbols; one skilled in the art will recognize that this is only approximately true in practice, but that this approximation is a very good one for all practical purposes.

The pair of matrices A 550 and B 510 are computed with the following properties:

1. B 510 is Hermitian, so that the transmitted signal power is preserved across pairs by the pre-processing operation;

2. $AH_mB=I$, so that the symbol vector component of the received signal is the same as the transmitted symbol vector, this allows the received signal to be sliced correctly after receiver post-processing; and 3. the sum of the SNRs (expressed in dB) of the independent received signals, i.e., the elements of the received symbol vector z(k), is maximized.

The algorithm that solves this problem is as follows:

Step 1: C is computed by solving the equation $CH_dR_dH_d^HC^H=I$. This implies that $E[CH_ddd^HH_d^HC^H]=I$. The resulting matrix C is a square matrix of dimension $n_r \times n_r$.

Step 2: The $n_r \times n_s$ matrix U and the $n_s \times n_s$ matrices Σ and V are computed as the solutions of the SVD (Singular Value Decomposition) equation $U\Sigma V^H=CH_m$.

Step 3: Then $B=V$ and $A=\Sigma^{-1}U^HC$.

This solution has the following properties:

Property 1 is satisfied by Step 3, since the matrix V is unitary.

Property 2 can be verified by substituting the equalities in Step 2 and Step 3 into the expression of the property:

$$AH_mB=(\Sigma^{-1}U^HC)H_mV=V^H(V\Sigma^{-1}U^H)(CH_m)V=V^H(CH_m)^H(CH_m)V=I.$$

As for Property 3, it can be verified as follows. Using the expression in Step 1, the noise covariance after MIMO post-processing at the receiver of the multiline system is $$E[AH_d\underline{dd}^H H_d^H A^H] = E\left[\sum\nolimits^{-1} U^H CH_d\underline{dd}^H H_d^H C^H U \sum\nolimits^{-1}\right] =$$

$$\sum\nolimits^{-1} U^H E[CH_d\underline{dd}^H H_d^H C^H]U\sum\nolimits^{-1} = \sum\nolimits^{-1} U^H CH_d R_d H_d^H C^H U \sum\nolimits^{-1} = \sum\nolimits^{-2}.$$

Consider now a tall matrix W of the same dimensions as U such that $U^HW=0$. We can define a modified MIMO post-processing matrix $\tilde{A}$ as follows: $\tilde{A}=\Sigma^{-1}(U+W)^HC$. This implies that $\tilde{A}H_mB=I$. The noise covariance after MIMO post-processing at the receiver of the multiline system with the modified MIMO post-processing matrix $\tilde{A}$ is $$E[\tilde{A}H_d\underline{dd}^H H_d^H \tilde{A}^H] = E\left[\sum\nolimits^{-1}(U+W)^H CH_d\underline{dd}^H H_d^H C^H(U+W)\sum\nolimits^{-1}\right] =$$

$$\sum\nolimits^{-1}(U+W)^H E[CH_d\underline{dd}^H H_d^H C^H](U+W)\sum\nolimits^{-1} =$$

$$\sum\nolimits^{-1}(U+W)^H CH_d R_d H_d^H C^H(U+W)\sum\nolimits^{-1} =$$

$$\sum\nolimits^{-1}(U+W)^H(U+W)\sum\nolimits^{-1} = \sum\nolimits^{-2} + \sum\nolimits^{-1} W^H W \sum\nolimits^{-1}$$

Clearly, the covariance of the noise in this system is minimized with $W=0$, which means that the MIMO post-processing matrix A satisfies Property 1.

The split-pair MIMO processing architecture of FIG. 5 uses the pre-processing matrix B 510 at the transmitter and the post-processing matrix A 550 at the receiver to coordinate the transmitted and received signals in a fashion that preserves the integrity of the transmitted signal w(k) 550, while simultaneously pre-whitening the crosstalk noise to create a set of directions in the symbol vector space, namely a subspace, that is free of crosstalk noise.

In particular, the interference noise after receiver post-processing is given by $AH_dd(k)$. As shown above, the covariance of the noise after post-processing is equal to $\Sigma^{-2}$, which implies that this received noise has been diagonalized. This in turn means that the subspace that is orthogonal to the range space of the interference noise vector, namely the nullspace of the interference noise, now contains some of the channels of the multiline system. Moreover, due to the addition of the split-pair receivers, the dimension of the subspace that is free of crosstalk noise has been increased.

Hence, compared to a multiline system without split-pair receivers, more channels are now free of noise and can carry significantly higher bitrates than the channels that are in the range space of the interference noise, which continue to be impaired. In other words, the split-pair MIMO processing of FIG. 5 increases the total number of available channels and then restricts the effect of the interference noise to the minimum possible number of channels, and therefore is optimal with respect to the criterion of maximizing the overall capacity of the multiline transmission system.

Figure 6:
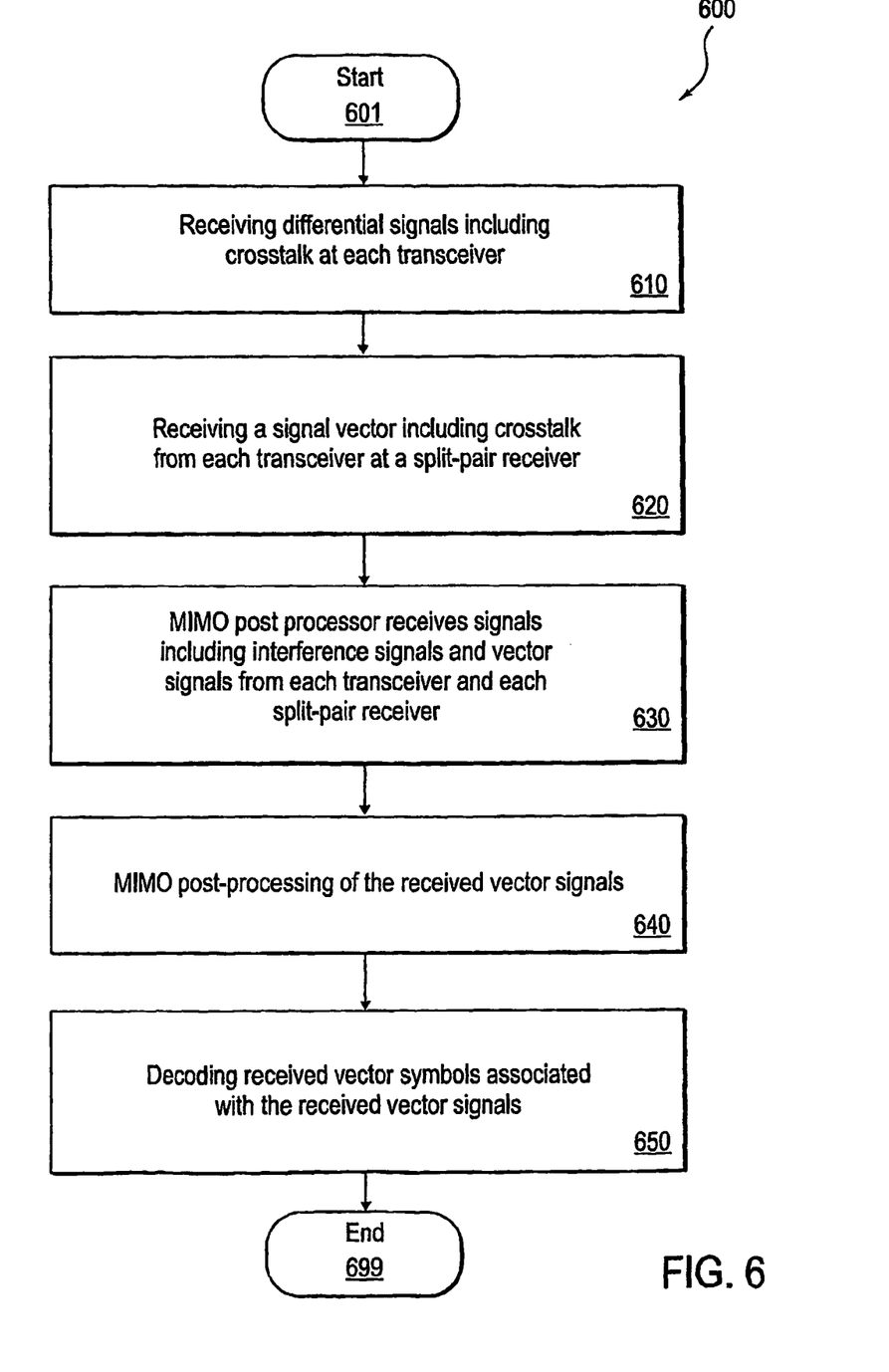
FIG. 6 illustrates an exemplary split-pair MIMO transmission process 600 once a processing architecture is computed according to one embodiment of the present invention.

FIG. 6 illustrates exemplary MIMO post-processing process 600 once a processing architecture is computed according to one embodiment of the present invention. Process 600 commences at block 601. At processing block 610, each transceiver in the split-pair multiline transmission system receives differential signal vectors including crosstalk. The crosstalk received is not limited in origin and may be alien crosstalk or crosstalk from sources outside or external to the split-pair multiline transmission system. The split-pair receiver receives a signal vector including crosstalk from each transceiver at processing block 620. The MIMO post-processing unit receives signals including interference signals and vector signals from each transceiver and each split-pair receiver at processing block 630. At processing block 640, a MIMO post-processor with a receiver converts each of the received signal vectors into received symbol vectors. The received symbols are decoded at processing block 650. The process completes at block 699.

Figure 7:
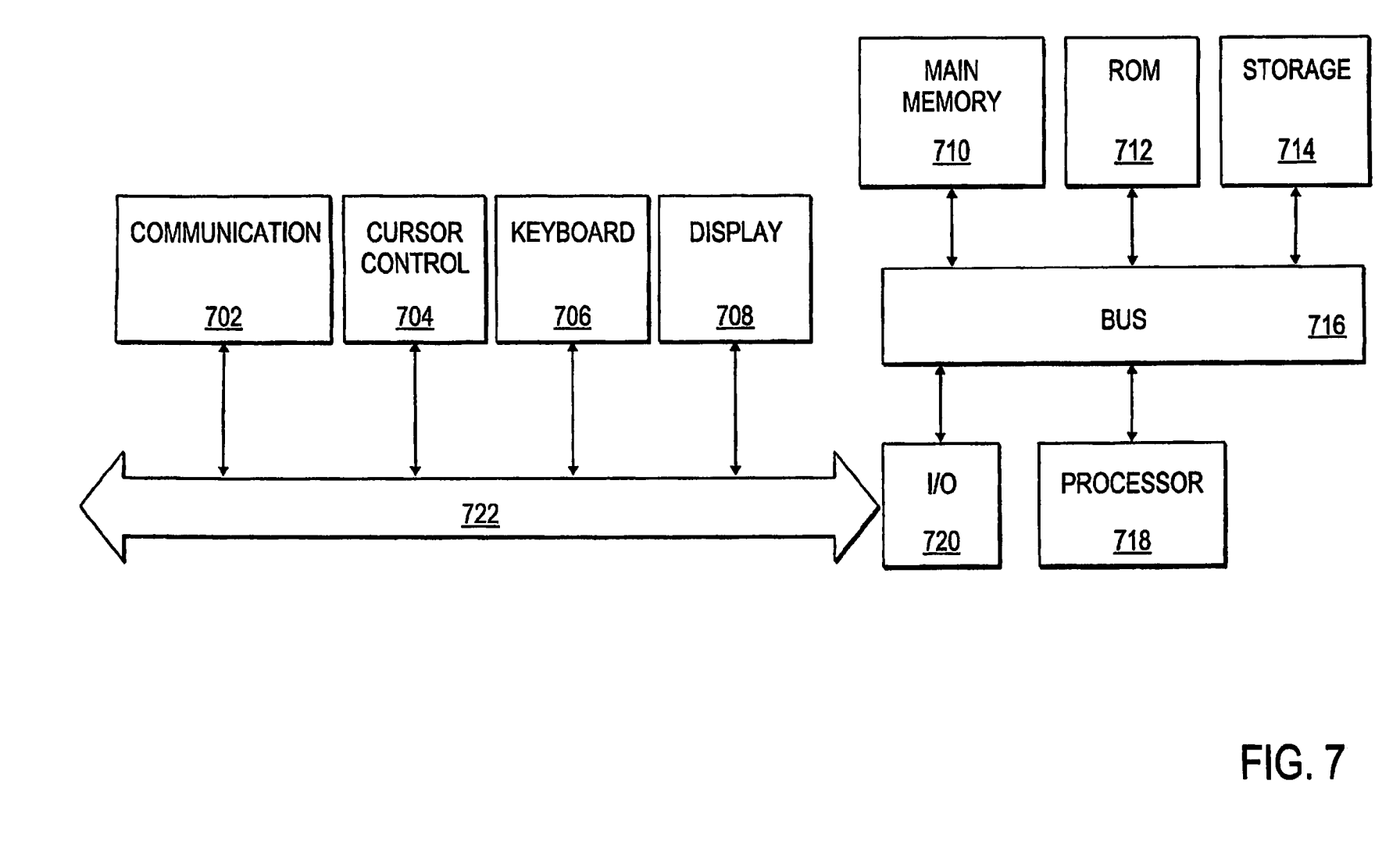
FIG. 7 illustrates an exemplary block diagram of a computer system 2000 representing an integrated multi-processor, in which elements of the present invention may be implemented.

FIG. 7 illustrates an exemplary block diagram of a computer system 700 representing an integrated multi-processor, in which elements of the present invention may be implemented. Computer system 700 can be used to perform the method 600 as referenced in FIG. 6. One embodiment of computer system 700 comprises a system bus 716 for communicating information, and a processor 718 coupled to bus 716 for processing information. Computer system 700 further comprises a random access memory (RAM) or other dynamic storage device 710 (referred to herein as main memory), coupled to bus 716 for storing information and instructions to be executed by processor 718. Main memory 710 also may be used for storing temporary variables or other intermediate information during execution of instructions by processor 718. Computer system 700 also may include a read only memory (ROM) and/or other static storage device 712 coupled to bus 716 for storing static information and instructions used by processor 718.

A data storage device 714 such as a magnetic disk or optical disc and its corresponding drive may also be coupled to computer system 700 for storing information and instructions. Computer system 700 can also be coupled to a second I/O bus 722 via an I/O interface 720. A plurality of I/O devices may be coupled to I/O bus 722, including a display device 708, an input device (e.g., an alphanumeric input device 706 and/or a cursor control device 704). For example, video news clips and related information may be presented to the user on the display device 708.

The communication device 702 is for accessing other computers (servers or clients) via a network. The communication device 702 may comprise a modem, a network interface card, or other well-known interface device, such as those used for coupling to Ethernet, token ring, or other types of networks.

In the foregoing specification, the invention has been described with reference to specific embodiments. It will, however, be evident that various modifications and changes can be made without departing from the broader spirit and scope of the invention as set forth in the claims. The specification and drawings are, accordingly, to be regarded in an illustrative rather than a restrictive sense.

What is claimed is:

1. A multiline communication system for reducing signal distortion, the system comprising:

a first and second pair of lines in a multiline communication system;

a first and second transceiver electrically connected to the corresponding first and second pair of lines;

a split-pair receiver electrically connected to a line of the first pair of lines and a line of the second pair of lines and configured to identify crosstalk on the first and second transceivers;

a frequency equalizer; and a post-processing unit configured to perform MIMO post-processing on signal vectors received at each transceiver of the pair of transceivers and the split-pair receiver, wherein the split-pair receiver receives a signal including the crosstalk from the first and second transceivers and provides a corresponding signal vector to the post-processing unit, and wherein the post processing unit is further configured to minimize crosstalk on the first and second pair of lines in the multiline communication system with the frequency equalizer, and wherein the line of the first pair of lines is a transmitting line and the line of the second pair of lines is a receiving line.

2. The system of claim 1, wherein the first and second pair of lines comprise:

a twister pair of copper lines.

3. The system of claim1, further comprising:

a first and second analog front end circuit electrically connected to the respective first and second pair of lines in the multiline communication system and the respective first and second transceivers.

4. A multiline communication system for reducing signal distortion, the system comprising:

a first and second pair of lines in the multiline communication system;

a first and second transceiver electrically connected to the corresponding first and second pair of lines;

a split-pair receiver electrically connected to a line of the first pair of lines and a line of the second pair of lines and configured to identify crosstalk on the first and second transceivers a frequency equalizer; and a post-processing unit configured to perform MIMO post-processing on signal vectors received at each transceiver of the pair of transceivers and the split-pair receiver, wherein the split-pair receiver receives a signal including the crosstalk from the first and second transceiver and provides a corresponding signal vector to the post-processing unit, and wherein the post processing unit is further configured to minimize crosstalk on the first and second pair of lines in the multiline communication system with the frequency equalizer and wherein the line of the first pair of lines is a transmitting line and the line of the second pair of lines is a transmitting line.

5. A multiline communication system for reducing signal distortion, the system comprising:

a first and second pair of lines in the multiline communication system;

a first and second transceiver electrically connected to the corresponding first and second pair of lines;

a first split-pair receiver electrically to a transmitting line of the first pair of lines and a receiving line of the second pair of lines and configured to identify crosstalk on the first and second transceivers;

a second split-pair receiver electrically connected to a receiving line of the first pair of lines and a transmitting line of the second pair of lines;

a frequency equalizer; and a post-processing unit configured to perform MIMO post-processing on signal vectors received at each transceiver of the pair of transceiver and the split-pair receiver, wherein the split-pair receiver receives a signal including the crosstalk from the first and second transceivers and provides a corresponding signal vector to the post-processing unit, and wherein the post processing unit is further configured to minimize crosstalk on the first and second pair of lines in the multiline communication system with the frequency equalizer.

6. The system of claim 4, further comprising:

a first and second analog front end circuit electrically connected to the respective first and second pair of lines in the multiline communication system and the respective first and second transceivers.

7. The system of claim 4, wherein the first and the second pair of lines comprise:

a twisted pair of copper lines.

8. The system of claim 5, further comprising:

a first and second analog front end circuit electrically connected the respective first and second pair of lines in the multiline communication system and the respective first and second transceivers.

9. The system of claim 5, wherein the first and second pair of lines comprise:

a twisted pair of copper lines.

* * * * *

UNITED STATES PATENT AND TRADEMARK OFFICE
CERTIFICATE OF CORRECTION

PATENT NO. : 7,649,828 B2 Page 1 of 1
APPLICATION NO. : 10/526145
DATED : January 19, 2010
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Twenty-third Day of November, 2010

David J. Kappos
*Director of the United States Patent and Trademark Office*